United States Patent [19]

Genson

[11] 4,230,257

[45] Oct. 28, 1980

[54] METHOD OF AND APPARATUS FOR APPLYING SOLDER TO METALLIC BLANKS

[75] Inventor: Charles W. Genson, Bowling Green, Ohio

[73] Assignee: Libbey-Owens-Ford Company, Toledo, Ohio

[21] Appl. No.: 965,603

[22] Filed: Dec. 1, 1978

[51] Int. Cl.³ .............................................. B23K 1/02
[52] U.S. Cl. ..................................... 228/244; 118/59; 228/41; 228/46; 228/47; 427/11; 427/123; 427/319
[58] Field of Search ...................... 228/41, 47, 46, 244, 228/245; 118/59, 76, 230; 219/85 R, 85 G; 427/11, 123, 319

[56] References Cited

U.S. PATENT DOCUMENTS

| | | | |
|---|---|---|---|
| 1,749,719 | 3/1930 | Reiter et al. | 219/85 G |
| 2,407,208 | 9/1946 | Sherwood | 118/59 |
| 2,685,268 | 8/1954 | Yeo et al. | 228/41 X |
| 3,283,987 | 11/1966 | Kauffman | 228/41 X |
| 3,940,046 | 2/1976 | Fern | 228/41 X |

*Primary Examiner*—Francis S. Husar
*Assistant Examiner*—K. J. Ramsey
*Attorney, Agent, or Firm*—Collins, Oberlin & Darr

[57] ABSTRACT

A method of and apparatus for applying beads of solder to a metallic plate as an integral part thereof for subsequent attachment to another component in an assembly operation.

10 Claims, 6 Drawing Figures

100 % 
METHOD OF AND APPARATUS FOR APPLYING SOLDER TO METALLIC BLANKS

BACKGROUND OF THE INVENTION

The present invention relates generally to the production of terminals or connectors and, more particularly, to a method of and apparatus for applying solder beads to such connectors for subsequent attachment to the terminals of an electrical heating grid circuitry formed on a vehicle glazing closure.

A well known expedient for defogging or deicing windows, particularly the rear windows, of automative vehicles and the like is the use of heating circuits comprised of electrical resistance elements. Often these resistance elements are formed of an electrically conducting material formed in a pattern of parallel lines extending lengthwise of the window or in a generally horizontal direction when installed in the vehicle, and which are connected at their opposite ends to electrodes or bus bars located adjacent the opposite ends of the glass sheets and which extend generally transversely thereof. The bus bars, in turn, are adapted to be provided with suitable terminals for connection to the vehicle electrical system. The electrically conducting material of which the parallel lines, bus bars and terminals are formed is imprinted on the inboard or inner surface of the glass sheet in the desired pattern and then fired or fused thereon under high temperature conditions.

While such terminals admirably serve the purpose for which they were designed in fixed glazing closures, problems are encountered when such fused terminals are employed on movable glazing closures, such as the rear windows of station wagons for example because of the problems encountered when opening and closing the movable closure. Rather than employing flexible connectors or conductors leading to such terminals, recent designs incorporate the conductors in the vehicle body that terminate in contacts which are engageable by the terminals of the movable closure when closed to provide a closed circuit for the resistance elements. However, the impact or frictional engagement of the heating circuit's terminals with the vehicle's electrical system contacts causes the fused material to wear and thereby short out and arc, burning off portions of the terminals to disable the heating circuit. In order to eliminate this problem, it has been found desirable to attach, as by soldering, metallic striker plates onto the fused terminals to better accommodate frictional movement of the vehicle's electrical contacts therewith, and thereby protect and prolong the useful life of the terminals.

Preferably, the striker plates are provided with beads of solder formed integral thereon prior to the attachment thereof to the terminals during production. Attempts to apply the solder beads to the plates with ordinary hand operated tools are not only too slow to be economically feasible, but also lack the capability of dispensing uniform amounts of solder onto the plates from plate to plate.

SUMMARY OF THE INVENTION

The primary object of the present invention is to provide a new and useful method of and apparatus for automatically applying predetermined amounts of solder onto a metallic plate.

Another object of this invention is to provide an apparatus for rapidly applying uniform amounts of solder to such plates rapidly and at a minimum of costs.

The foregoing and other objects, advantages, and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
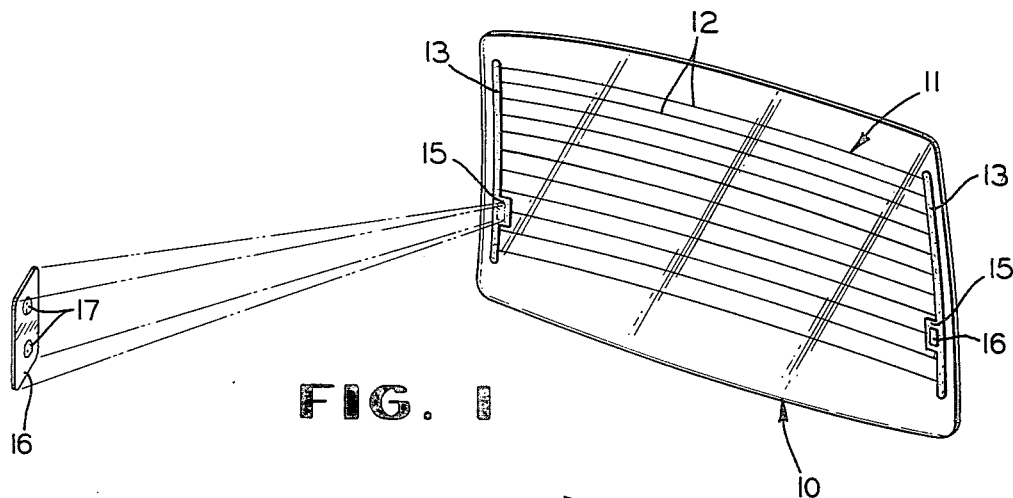
FIG. 1 is a perspective view of a typical heated glazing closure having a heating circuit imprinted thereon and a metallic striker plate adapted to be soldered thereon.

Referring now in detail to the accompanying drawings, there is shown in FIG. 1 a glazing closure in the form of a heated backlight 10 utilized in the rear window opening of a movable tailgate door of a station wagon vehicle or the like. The heated backlight 10 is formed of a bent or curved, tempered glass sheet provided with an electrical heating circuit or grid, generally designated 11, comprising a plurality of substantially parallel, electrically conducting lines 12 on the inwardly directed concave or inboard surface of the glazing closure. These lines 12 are connected in parallel at their opposite ends to electrodes or bus bars 13 located at either end of the glass sheet and having suitable terminals 15 adapted to be connected to the vehicle's electrical system. The lines 12, bus bars 13 and terminals 15 preferably are formed of a suspension of silver and frit particles in an organic binder initially imprinted on the inboard surface of the glass, as by a silk screen process for example, and thereafter fired or fused onto the glass. In use in a vehicle, energization of the circuit causes current to flow through conducting frit lines 12 to generate sufficient heat for deicing or defogging the backlight 10 as required. The frit lines 12 appear only as very fine lines on the inboard surface of the backlight 10 so as not to materially obstruct the viewing area, their size being somewhat exaggerated in FIG. 1 for purposes of illustration. On the other hand, the bus bars 13 are substantially wider and can be masked by dark bands, if desired. The circuit or grid 11 is positioned on the inboard surface to minimize deterioration thereof otherwise resulting from weathering and excessive abrasive cleaning after subsequent installation of a vehicle.

It should be noted that in conventional fixed heated backlights, the opposite ends of the bus bars are affixed to lead-in-wires electrically connected to suitable terminals, in turn connected to the vehicle's electrical system. However, in movable heated backlights, such as would be incorporated in a tailgate or rear door of a station wagon for example, it has been found impractical to employ such lead-in-wires because of the flexibility and increased length requirements, and also because of their vulnerability to damage during movement of the heated backlight, whether hingedly mounted for pivotal movement or for sliding movement within the door framework. Thus, terminals 15 of substantially enlarged formations, are provided on the bus bars 13 to engage, when closed, fixed contacts mounted on the vehicle and which constitute a part of the vehicle's electrical system. In order to protect the terminals 15 and preclude the removal of or damage to the frit composition constituting the terminals due to the impact or frictional engagement thereof with the vehicle's electrical contacts, connectors or striker plates 16 of a suitable electrically conductive, durable metallic material are affixed, as by soldering, to the terminals 15 in a superimposed relation thereto. Thus, the striker plate 16 absorbs the impact or frictional force otherwise imparted to the frit composition constituting the terminals 15 and thereby serves as a shield protecting the same. Preferably, the striker plates 16 are prepared and initially provided with beads of solder 17 prior to their assembly onto the terminals 15 during a production run in a large volume operation.

Figure 2:
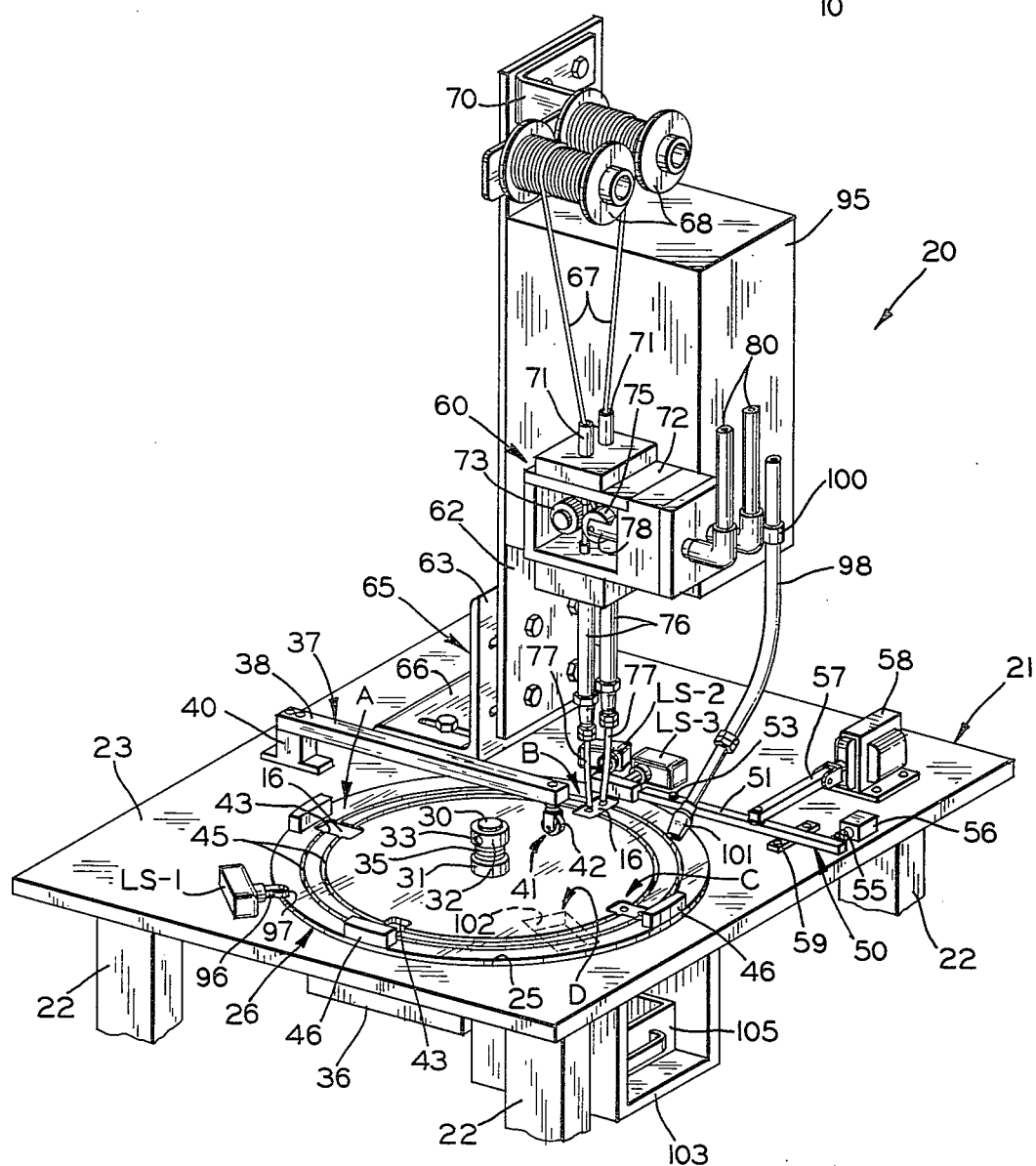
FIG. 2 is a perspective view of a solder applying apparatus constructed in accordance with this invention.

In accordance with this invention, a solder applying apparatus, comprehensively designated 20 and shown in its entirety in FIG. 2, is employed to dispense discrete amounts of solder onto the striker plates 16 for subsequent use in a production soldering operation. Apparatus 20 comprises a table 21 suitably supported on a plurality of upright posts or legs 22. The table 21 is of a generally rectangular shape in plan and has an upper surface 23 formed with a circular indentation or basin 25 for accommodating a complementary shaped circular turntable 26 mounted for rotary movement relative to table 21. The basin 25 is defined by an annular wall 27 and a bottom wall 28 serving as a bearing surface for the bottom surface of the rotatable turntable 26.

The means for rotating turntable 26 includes a drive shaft 30 rigidly secured thereto and extending upwardly through a centrally located boss 31 formed on the turntable 26. The upper end of drive shaft 30 is provided with a collar 32 secured in place thereto as by a set screw 33. A helical compression spring 35 is disposed about the drive shaft 30 between boss 31 and collar 32 to bias the turntable against the bearing surface of basin bottom wall 28. The other or lower end of the drive shaft 30 is operatively connected to a drive arrangement, shown diagrammatically as a box and identified by reference numeral 36, the drive including the usual electric motor (not shown) and gear reduction mechanism (also not shown) well known in the art.

In addition to the force exerted by spring 35, a pressure arm 37 also is provided to maintain the turntable 26 against the basin bottom wall 28. The pressure arm 37 includes an elongated bar 38 mounted at its one end on an upstanding support 40 secured to table 21. The other end of bar 38 is provided with a spring loaded castor 41 having an anti-friction roller 42 bearing against the turntable 26.

A plurality of rectangularly shaped through openings 43 are formed in turntable 26 for receiving the workpieces, specifically, rectangular metallic blanks constituting the striker plates 16 earlier mentioned. While four such equally circumferentially spaced openings 43 preferably are formed in turntable 26, it should be appreciated that more or less than four openings can be provided, if desired. The turntable 26 also is formed with a pair of radially spaced, substantially continuous, annular grooves 45 for accommodating the two nozzle tips of the solder dispensing apparatus, which will hereinafter be described in detail.

A plurality of actuators 46 are mounted, as by suitable fasteners 47, on turntable 26 adjacent the peripheral edge thereof in radially spaced relation to the openings 43 for actuating a series of electrical limit switches hereinafter described in connection with the operation of apparatus 20.

In the illustrative embodiment depicted in the drawings, the turntable 26 is intermittently indexed approximately 90° for conveying a blank or plate 16 in a generally horizontal plane for movement in a substantially horizontal, circular path from a loading area A, through a heating and solder applying area B, then through a cooling area C for solidifying the applied solder and finally to an unloading or discharge area D.

Figure 3:
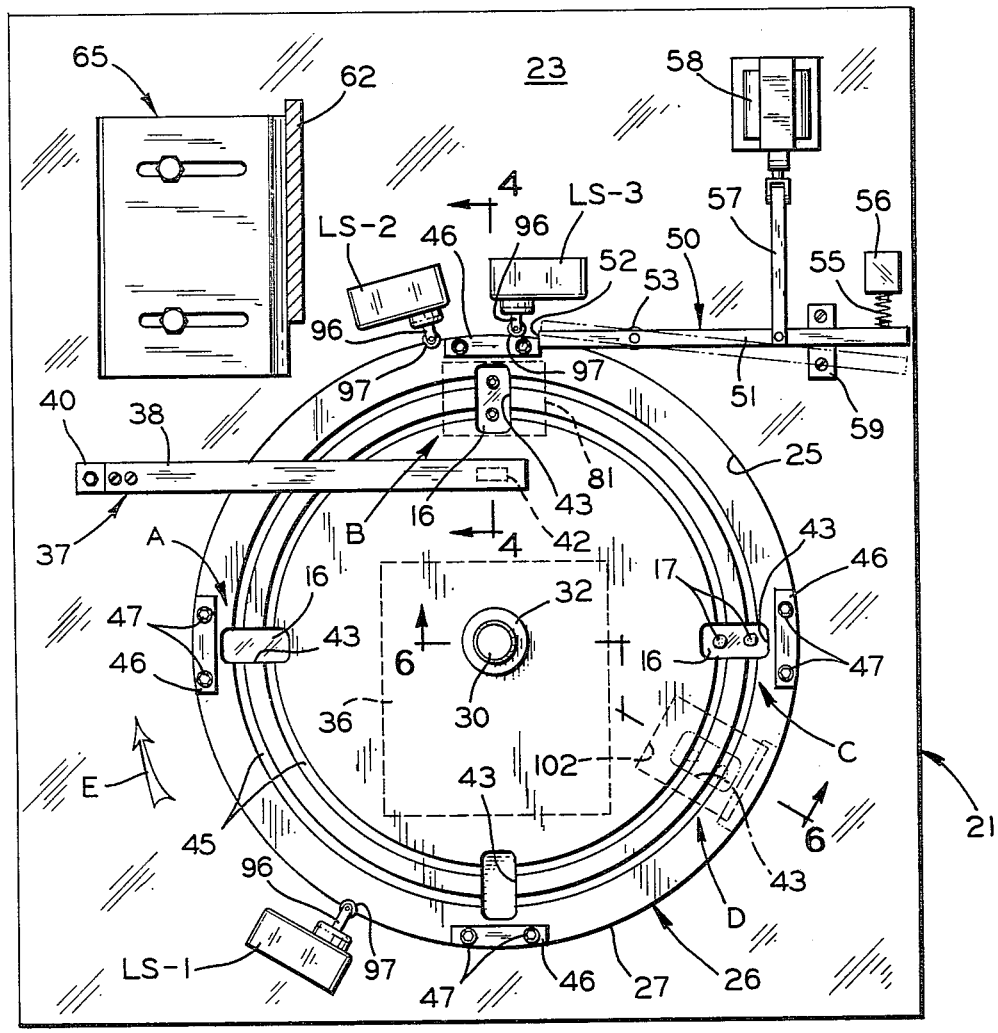
FIG. 3 is a top plan view of the turntable associated with the apparatus of FIG. 2 with certain of the superstructure removed for the sake of clarity.

The metallic blanks constituting striker plates 16 are individually placed into openings 43 preferably in the loading area A during a dwell period of the turntable 26. The turntable 26 is then rotated or indexed 90° to advance the blank 16 to the heating and solder applying area B whereat solder is melted as globules and deposited onto the blank 16. A locator stop 50 is positioned in the path of movement of the actuator 46 to stop turntable 26 and accurately position the blank 16 in the desired location for receiving the molten solder globules. The stop 50 comprises an elongated rod 51 having an abutting end 52 adapted to be engaged by the actuator and is mounted for pivotal movement in a horizontal plane about a vertical pivot pin 53. The rod 51 is biased in a clockwise direction, as viewed in FIG. 3, by means of a helical spring 55 interposed between a support 56 mounted on table 21 and the other end of rod 51. A lever 57, actuated by a solenoid 58, is affixed at its distal end to the rod 51 for pivoting the same about pin 53 against the bias of spring 55. The rod 51 oscillates on a guide block 59 suitably mounted on table 21.

Apparatus 20 includes a solder dispensing mechanism, generally designated 60, located above table 21 and a heating element 61 mounted on table 21 below the solder dispensing mechanism 60. The solder dispensing mechanism 60 includes a frame comprising an upright support plate 62 adjustably secured adjacent its lower end to the vertical leg 63 of an angle member 65, in turn adjustably secured along its horizontal leg 66 to the table 21. The relatively adjustable mounting of the support plate 62 and angle member 65 permits accurate location of the solder dispensing mechanism 60 relative to the blanks 16 when accurately positioned via locator stop 50.

Predetermined increments of solder are intermittently fed onto blank 16 when the latter is located in its proper indexed position. To this end, supplies of solder are provided in the form of continuous strips 67 wound upon spools 68 freely rotatably mounted on a common bracket 70 affixed to the upright support plate 62. Each solder strip 67 is threaded through a guide tube 71 mounted in the housing 72 and then between a knurled drive wheel 73 and a reciprocal idler wheel 75 bearing against the strip and suitably mounted and encased within housing 72. The tractive force generated between wheels 73 and 75 feeds the strip 67 axially through a nozzle 76 projecting downwardly from the housing 72 and which terminates in a slightly bent outlet tube 77 guiding the solder strip 67 onto plate 16 located therebeneath. Identical structure, operative in the same manner, intermittently feeds the other solder strip 67 so that both solder strips 67 are simultaneously fed equal increments in the above-described manner.

The reciprocal idler wheel 75 provides the back-up force necessary for coaction with drive wheel 73 to generate the tractive force required to feed the solder strip. The idler wheel 75 is mounted on a yoke 78, in turn operatively connected to a suitable single acting, fluid actuating cylinder (not shown) enclosed within housing 72 and having the usual piston rod and reciprocal piston. A fluid supply conduit 80 is connected at its one end to the cylinder and at its other end to a suitable source of fluid under pressure (also not shown). The cylinder is operative to normally maintain the idler wheel 75 constantly extended into an operable position in bearing engagement against the solder strip. However, the idler wheel 75 can be retracted into an inoperative, solder disengaged position, as desired or required, such as when threading a fresh solder strip between wheels 73 and 75 for example.

In order to melt the solder dispensed through outlet tubes 77, the blank or plate 16 is heated by the conductive heat generated in electrical resistance heating element 61. The heating element 61 is in the form of a rectangular metallic plate 81 mounted within a cavity 82 formed in the table 21. The plate 81 is provided with a downwardly projecting threaded stud 83 for receiving the connector 85 of an electrical lead 86, the connector 85 being fixed in place thereon by nuts 87 tightened against the opposite sides of lead connector 85.

Figures 4, 5:
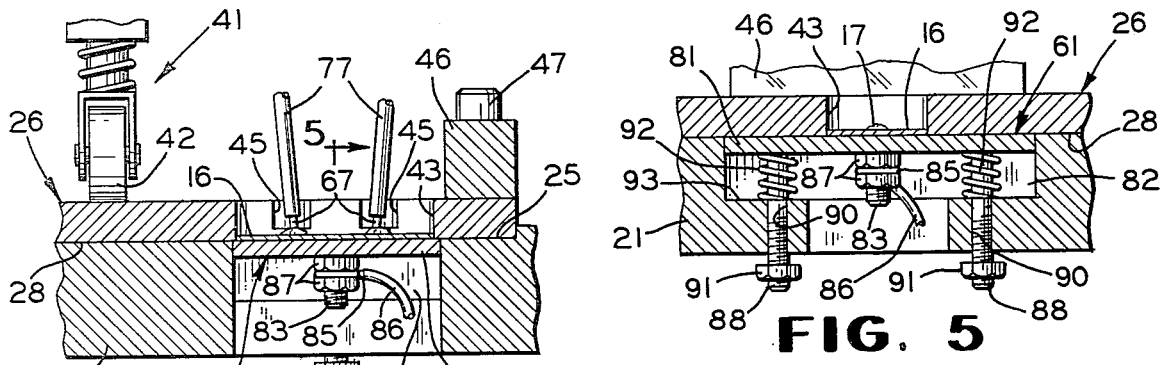
FIG. 4 is a vertical sectional view, on an enlarged scale, taken along line 4—4 of FIG. 3.
FIG. 5 is a vertical sectional view taken along the line 5—5 of FIG. 4.
Figure 6:
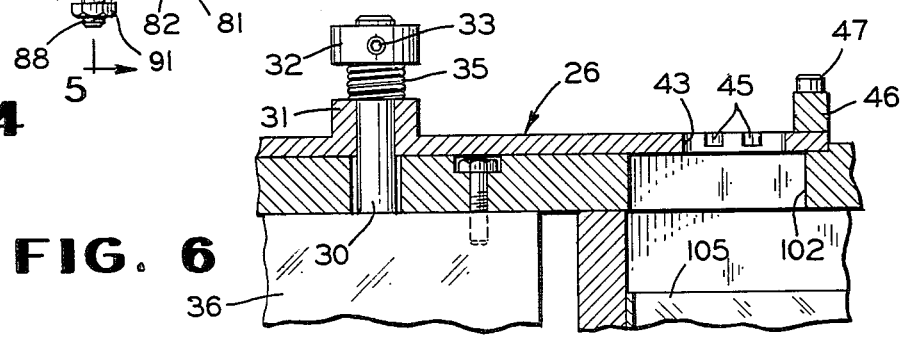
FIG. 6 is a vertical sectional view, on an enlarged scale, taken along line 6—6 of FIG. 3.

A significant feature of this invention resides in resiliently mounting the heating plate 81 within cavity 82, allowing the plate 81 to be slightly displaced vertically during feeding of the solder strips 67. To this end, a pair of studs 88 (FIG. 5) are affixed to and project downwardly from the heating plate 81 through suitable openings 90 formed in the table 21 and are provided with nuts 91 threaded thereon in spaced relation to the bottom surface of table 21. Compression springs 92 are disposed about the studs 88, respectively, between heating plate 81 and the opposed face 93 defining cavity 82 for biasing the plate 81 in an upper position substantially flush with basin bottom wall 28.

The force of the rigid solder strips 67 being fed and acting against the blank 16 is transmitted thereby to the heating plate 81, causing the latter to descend slightly against the bias of springs 92 until the heat generated by plate 81 and conducted through blank 16 reaches a temperature sufficient to soften and melt the distal end portions of the strips 67. The initial downwardly acting force is accordingly dissipated upon melting of the solder and the force of the springs 92 urge the plate 81 and plate 16 upwardly to their respective normal positions. The resilient mounting of heating plate 81, which also serves as a support for the workpiece, allows the plate 81 to yield sufficiently to accommodate the discrete lengths of rigid solder being fed and advanced against striker plate 16.

Rotation of the turntable 26, feeding of the solder strips 67, and the heating of plate 81 is effected by a suitable electrical control circuit (not shown) located in a housing or box 95 mounted on the upright support plate 62 and connected to a suitable souce of electrical power, also not shown. The control circuitry includes a reversible motor for rotating drive wheel 73 and several timers for controlling indexing of the table 26, and energization of the reversible solder feed motor and solenoid 58. Since such timing arrangements are known and per se, form no part of the present invention, no further amplification or detailed description thereof is believed necessary. This control circuitry also includes limit switches LS-1, LS-2 and LS-3 mounted on table 21 adjacent the periphery of turntable 26 and each is provided with a suitable plunger 96 and roller 97 disposed in the path of movement of actuators 46 for activation thereby as will be described in detail in connection with the operation of apparatus 20.

As earlier mentioned, heat imparted to the blank 16 is transmitted thereby to the distal end portions of the solder strips 67, which are brought into engagement with the blank 16, melting such portions which subequently separate as molten globules from the remainder of the strips 67. While these molten globules begin solidifying as soon as the blank 16 is moved off heating plate 81 upon indexed movement of the turntable 26, means are provided for positively cooling the blank 16 and thereby the globules 17 to assure solidification thereof as solid beads prior to removal of the finished blank or plate 16 from the turntable 26. Such cooling means comprises a tubular conduit 98 suitably secured, as by one or more clamps 100, to control box 95 and connected via suitable control valve (not shown) to a suitable source of air under pressure (also not shown). The conduit 98 terminates in a discharge outlet 101 for directing a stream of cooling fluid, preferably air, against the plate 16 and the solder beads 17 deposited thereon. The control valve can be operable to continuously supply air or, if desired, can be triggered by a timer or other electrical control in box 95 to supply air when the blank or striker plate 16 reaches the cooling area C and to interrupt the flow of air when the plate 16 advances therebeyond.

A substantially rectangularly shaped opening 102 is formed in table 21 to permit discharge of a finished striker plate 16 therethrough when aligned with opening 43 upon indexed movement of the turntable 26. A box-like shelf 103 is provided beneath table 21 and rigidly secured thereto for supporting a receptacle 105 adapted to accumulate the finished pieces.

In operation, with the electrical control circuitry and heating plate 81 energized and turntable 26 in a dwell position, a blank 16 is placed in an empty opening 43 at loading area A. Upon rotary movement of the turntable 26 in a clockwise direction as indicated by arrow E in FIG. 3, an actuator 46 engages the roller 97 of limit switch LS-1 to depress plunger 96 and effect closing of switch LS-1, completing a circuit activating and resetting a first timer to establish the dwell period for turntable 26 when stopped. As the opening 43 containing blank 16 approaches the solder applying area B, the actuator 46 associated therewith successively engages the rollers 97 of limit switches LS-2 and LS-3, respectively. Engagement with the roller 97 of limit switch LS-2 depresses its plunger 96 to condition a circuit operative to reset another or second timer to zero in readiness for the solder feeding cycle. Depression of the plunger 96 associated with switch LS-3 conditions a circuit resetting a third timer to zero which becomes operative when the second timer times out as will presently appear. When turntable 26 has angularly moved 90°, the leading end of actuator 46 engages the abutment end 52 of locator stop 50 terminate movement of the turntable 26, positioning the blank 16 directly beneath the outlet tubes 77 of solder dispensing mechanism 60. Substantially simultaneously, the roller 97 of limit switch LS-2 rides off the rear edge of actuator 46 to extend plunger 96 and activate the timer associated therewith to energize the motor controlling operation of drive wheels 73. The tractive force generated between wheels 73 and 75 advances the rigid solder strips downwardly against plate 16, urging the same and thereby heating plate 81 downwardly against the bias of springs 92. The blank 16 in its entirety rests on and is in full contact with the underlying heating plate 81 and is rapidly heated thereby via conduction. The heat imparted to blank 16 is transmitted to the distal end portions of the solder strip 67 now bearing thereagainst to melt such portions, relieving the downwardly directed force acting against the plate and allowing the same to rise to its normal position under the influence of springs 92. The melted solder portions tend to separate from the strips 67 as molten globules deposited on the blank 16. The timing of the second control timer is such that when predetermined amounts of solder have been fed for conversion into molten globules deposited on plate 16, the second timer times out and the third timer becomes operative to reverse the motor and rotate drive wheel 53 in a reverse direction to retract the solder strips 67 a slight distance, positively severing and clearing their distal ends from the molten portions remaining as deposits on plate 16.

At substantially the same time that the third timer becomes operative, the first timer times out to energize solenoid 58 and extend lever 57 for swinging locator stop 50 out of engagement with actuator 46, allowing the turntable 26 to index another quarter turn or 90°. The striker plate 16 with molten solder globules thereon is advanced to the cooling area C whereat a stream of cooling air is directed, via conduit 98 and nozzle 101, onto the plate 16, positively cooling the same and the solder deposits thereon to solidify the latter as permanent beads 17 affixed to the plate 16. During the next quarter turn of turntable 26, the finished piece passes over opening 102 and is discharged by gravity into receptacle 105. The above steps are repeated during each quarter or 90° turn of turntable 26 so that during each turntable dwell period, a fresh blank 16 is placed in an empty opening 43 at loading area. A while molten solder globules are being deposited onto a blank or pltae 16 at the solder applying area B and the previously applied globules on plate 16 are being solidified at the cooling area C.

From the foregoing, it is apparent that the objects of the present invention have been fully accomplished. The apparatus of this invention is operative to intermittently feed increments of rigid solder from continuous strips and remove the same in a molten state therefrom for deposit as globules or beads onto a metallic plate as a permanent part thereof for use in a subsequent assembly operation. By the provision of an indexable turntable adapted to convey the workpiece through a series of work stations, a plurality of steps can be simultaneously performed at the several stations to rapidly produce the finished pieces as a large volume operation at a minimum of costs.

While the specific workpiece (striker plate 16) illustrated and described is provided with two beads of solder, it should be appreciated that only one or more than two beads can be deposited onto the workpiece, as desired, by employing a single or any number of strip feeding arrangements, respectively, within the purview of this invention.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A method of applying solder to metallic blanks comprising: supporting a metallic blank in a substantially horizontal plane and moving the same bodily in a generally horizontal path successively through a series of operations, feeding an increment of a solid strip of solder against the blank by advancing said strip between a pair of feed wheels rotating in one direction, heating the blank and thereby an end portion of said solder strip bearing thereagainst substantially to the softening point of the solder to form a molten end portion, and reversing the rotation of said feed wheels to retract said solder strip and separate said molten end portion from the remainder of said strip to form a globule deposited on said metallic blank.

2. A method according to claim 1, including cooling said globule to solidify the same into a bead formed integral with said blank.

3. A method according to claim 1, including resiliently supporting said blank when feeding said strip of solder thereagainst to permit slight displacement of said blank by the force of said solder bearing thereagainst.

4. A method according to claim 1, including feeding two spaced increments of solid strips of solder against said blank, melting said increments of solder by applying heat thereto through said blank, and separating said molten increments of solder from the remainder of said strips to form spaced globules deposited on said blank.

5. A solder applying apparatus comprising: a table, a turntable mounted on said table for holding and indexing a metallic blank in a substantially circular path successively through a series of work stations, a frame on said table, a supply of solder in strip form mounted on said frame, means on said frame above said table for intermittently feeding an increment of said solder strip against said blank at one of said work stations, means at said one work station for heating said blank and thereby said increment of solder strip via conduction through said blank substantially to the softening point of said solder to melt said solder increment onto said blank as an integral part thereof, said feeding means comprising a drive wheel and an idler wheel between which said solder strip extends, and means rotating said drive wheel in one direction to advance said strip against said blank and subsequently rotating said drive wheel in an opposite direction to retract said solder strip for severing the same from said molten increment of solder.

6. A solder applying apparatus according to claim 5, including means at a subsequent work station for cooling said molten increment of solder to solidify the same as a bead on said blank as an integral part thereof.

7. A solder applying apparatus comprising: a table, a turntable mounted on said table for holding and indexing a metallic blank in a substantially circular path successively through a series of work stations, a frame on said table, a supply of solder in strip form mounted on said frame, means on said frame above said table for intermittently feeding an increment of said solder strip against said blank at one of said work stations, and means at said one work station for heating said blank and thereby said increment of solder strip substantially to the softening point thereof to melt said solder increment onto said blank as an integral part thereof, said heating means comprising a heating plate supporting said blank at said one work station.

8. A solder applying apparatus according to claim 7, including means for resiliently mounting said heating plate on said table permitting slight displacement of said blank upon feeding of said solder strip increment thereagainst.

9. A solder applying apparatus according to claim 8, wherein said resilient mounting means includes means biasing said heating plate into a normal workpiece-receiving position.

10. A solder applying apparatus comprising: a table, a turntable mounted on said table for holding and indexing a metallic blank in a substantially circular path successively through a series of work stations, a frame on said table, a supply of solder in strip form mounted on said frame, means on said frame above said table for intermittently feeding an increment of said solder strip against said blank at one of said work stations, means at said one work station for heating said blank and thereby said increment of solder strip substantially to the softening point thereof to melt such solder increment onto said blank, means at a subsequent work station for cooling said molten increment of solder to solidify the same as a bead on said blank as an integral part thereof, said feeding means comprising a drive wheel and an idler wheel having peripheral surfaces between which said solder strip extends, means for rotating said drive wheel in one direction to advance said strip against said blank and in an opposite direction to retract said strip and separate the same from said molten increment of solder, said heating means comprising a heating plate supporting said blank at said one work station, and means for resiliently mounting said heating plate on said table permitting slight displacement of said blank upon feeding of said solder strip increment thereagainst.

* * * * *